US012663934B2

(12) United States Patent
Brume et al.

(10) Patent No.: US 12,663,934 B2
(45) Date of Patent: *Jun. 23, 2026

(54) TAPE DEVICE TO REPLICATE DATA TO A PLURALITY OF REMOTE STORAGE DEVICES

(71) Applicant: INTERNATIONAL BUSINESS MACHINES CORPORATION, Armonk, NY (US)

(72) Inventors: Shawn Owen Brume, North Pole, AK (US); Carlos Sandoval Castro, Jalisco (MX); Ricardo Clemente Betancourt, Nayarit (MX); Parker Thomas Wall, Raleigh, NC (US); Jean Pierre Lavigne, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 286 days.

This patent is subject to a terminal disclaimer.

(21) Appl. No.: 17/816,473

(22) Filed: Aug. 1, 2022

(65) Prior Publication Data

US 2024/0045608 A1 Feb. 8, 2024

(51) Int. Cl.
*G06F 3/06* (2006.01)

(52) U.S. Cl.
CPC ............ *G06F 3/065* (2013.01); *G06F 3/0604* (2013.01); *G06F 3/0619* (2013.01); *G06F 3/067* (2013.01)

(58) Field of Classification Search
CPC ...... G06F 3/065; G06F 3/0604; G06F 3/0619; G06F 3/067
See application file for complete search history.

(56) References Cited

U.S. PATENT DOCUMENTS

| | | | |
|---|---|---|---|
| 6,477,628 B1 * | 11/2002 | Bish ..................... | G06F 11/1461 |
| | | | 714/E11.12 |
| 7,237,056 B2 | 6/2007 | Gold et al. | |
| 7,996,635 B2 * | 8/2011 | Kano ..................... | G06F 3/0686 |
| | | | 711/111 |
| 9,081,506 B2 | 7/2015 | Ochi | |

(Continued)

OTHER PUBLICATIONS

O. Asmussen, et al., "IBM Tape Library Guide for Open Systems", IBM Corporation, RedBooks, Document No. SG24-5946-17, Mar. 2022, pp. 376.

(Continued)

*Primary Examiner* — Eric T Loonan
(74) *Attorney, Agent, or Firm* — Konrad Raynes Davda & Victor LLP; David Victor

(57) ABSTRACT

Provided are a computer program product, system, and method for a tape device to replicate data to a plurality of remote storage devices. A replication request is received from the computing device to replicate data to a replication number of at least one remote storage device of the remote storage devices over a network. The data to replicate is transmitted to the replication number of at least one remote storage device. At least one device acknowledgment from the at least one remote storage device indicating complete of writing the data to replicate is received. A replication acknowledgment is transmitted to the computing device indicating that the data in the replication request has been replicated in response to receiving the at least one device acknowledgment from the replication number of the at least one remote storage device.

17 Claims, 6 Drawing Sheets

(56) References Cited

U.S. PATENT DOCUMENTS

| | | | |
|---|---|---|---|
| 10,282,098 B2 | 5/2019 | Hasegawa et al. | |
| 2004/0133737 A1* | 7/2004 | Jaquette | G06F 3/068 |
| | | | 711/111 |
| 2005/0108470 A1* | 5/2005 | Gold | G06F 3/0617 |
| | | | 714/E11.12 |
| 2008/0007856 A1* | 1/2008 | Tango | G11B 27/3027 |
| | | | 360/53 |
| 2009/0043829 A1 | 2/2009 | Mizuno | |
| 2010/0332776 A1* | 12/2010 | Uchikado | G06F 11/2064 |
| | | | 709/213 |
| 2015/0116857 A1* | 4/2015 | Ochi | G11B 27/02 |
| | | | 360/15 |
| 2022/0091944 A1 | 3/2022 | Goodall et al. | |

OTHER PUBLICATIONS

List of Patents or Patent Applications Treated as Related, dated Aug. 1, 2022, pp. 2.

U.S. Appl. No. 17/816,477, filed Aug. 1, 2022.

Response dated Oct. 11, 2023, 13 pp., to Office Action for U.S. Appl. No. 17/816,477.

Final Office Action dated Nov. 28, 2023, for U.S. Appl. No. 17/816,477.

Office Action dated Aug. 3, 2023, 12 pp. for U.S. Appl. No. 17/816,477.

Response dated Feb. 5, 2024, 13 pp., Final Office Action dated Nov. 28, 2023, for U.S. Appl. No. 17/816,477.

Notice of Allowance dated Feb. 28, 2024, 11 pp., for U.S. Appl. No. 17/816,477.

* cited by examiner

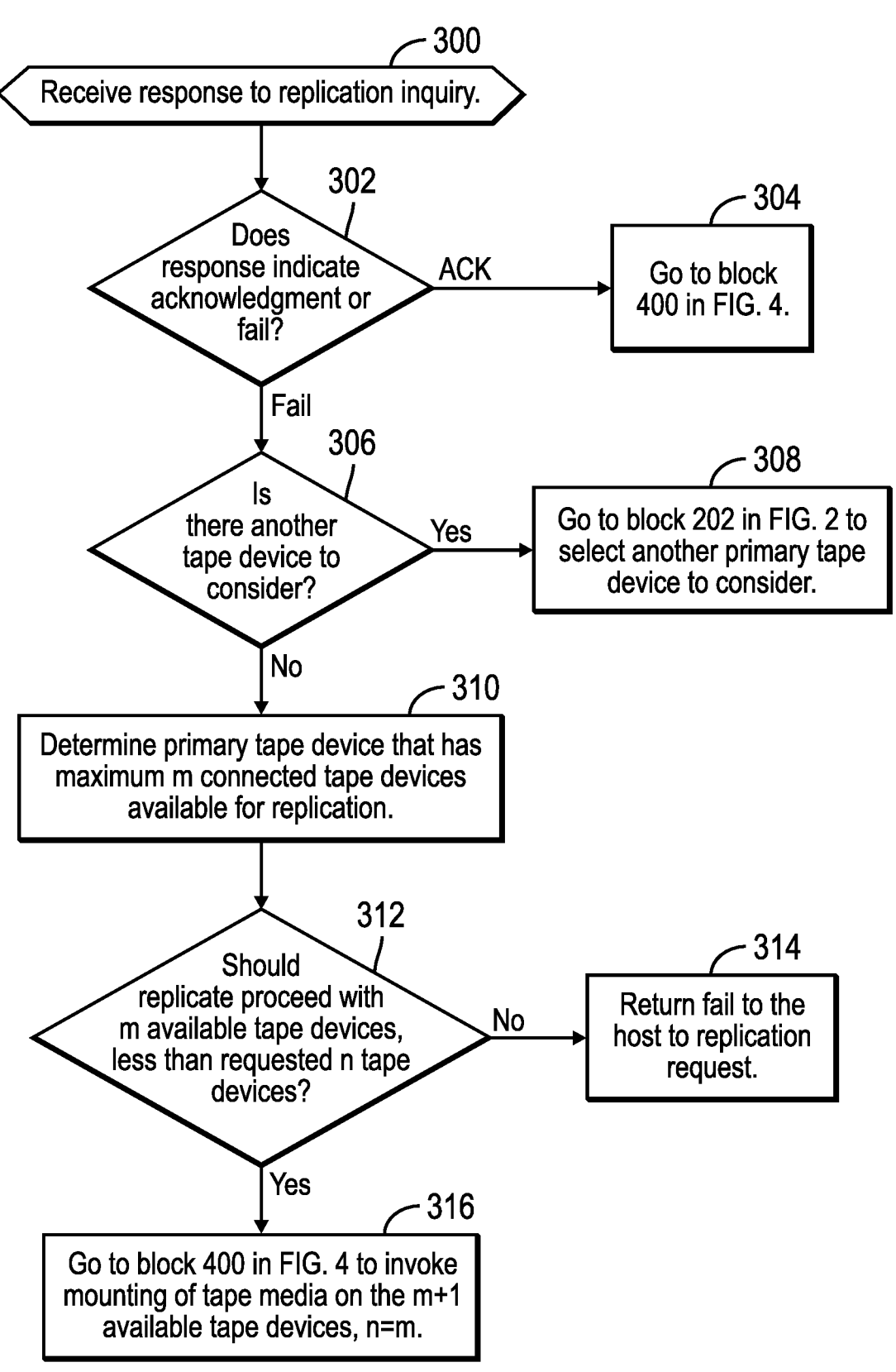

300

Receive response to replication inquiry.

302

Does response indicate acknowledgment or fail?

ACK

304

Go to block 400 in FIG. 4.

Fail

306

Is there another tape device to consider?

Yes

308

Go to block 202 in FIG. 2 to select another primary tape device to consider.

No

310

Determine primary tape device that has maximum m connected tape devices available for replication.

312

Should replicate proceed with m available tape devices, less than requested n tape devices?

No

314

Return fail to the host to replication request.

Yes

316

Go to block 400 in FIG. 4 to invoke mounting of tape media on the m+1 available tape devices, n=m.

FIG. 3

TAPE DEVICE TO REPLICATE DATA TO A PLURALITY OF REMOTE STORAGE DEVICES

BACKGROUND OF THE INVENTION

1. Field of the Invention

The present invention relates to a computer program product, system, and method for a tape device to replicate data to a plurality of remote storage devices.

2. Description of the Related Art

A tape server manages replication of data to archive and backup to a plurality of tape devices in a network. A tape device may comprise a stand-alone tape drive or a tape library system including a plurality of tape drives with a robotic arm to insert tape cartridges maintained in the tape library into the tape drives to store data in the tape cartridges. In such systems, the tape server manages the transfer of data to replicate to the tape drives over the network and maintains communication channels in the network for the data transfer.

There is a need in the art for improved techniques for replicating data to a tape devices.

SUMMARY

Provided are a computer program product, system, and method for a tape device to replicate data to a plurality of remote storage devices. A replication request is received from the computing device to replicate data to a replication number of at least one remote storage device of the remote storage devices over a network. The data to replicate is transmitted to the replication number of at least one remote storage device. At least one device acknowledgment from the at least one remote storage device indicating complete of writing the data to replicate is received. A replication acknowledgment is transmitted to the computing device indicating that the data in the replication request has been replicated in response to receiving the at least one device acknowledgment from the replication number of the at least one remote storage device.

BRIEF DESCRIPTION OF THE DRAWINGS

FIG. 3 illustrates an embodiment of operations performed by a tape server to process a response to the replication inquiry request to the primary tape device to determine whether to continue processing the host replication request.

DETAILED DESCRIPTION

In current tape replication environments, a tape server manages the replication of data to multiple tape drives. This places significant computational and network bandwidth burdens on the tape server to manage the network connections to the tape devices involved in the replication and generate the write requests to the different connected tape devices to write the data to replicate. Described embodiments provide improvements to computer technology for managing tape replication operations by having the tape server offload most of the computational and network intensive operations to a primary tape drive to manage tape drive availability inquiries, mount/load operations, and the write operations to write the data. This relieves the tape server from substantial computational and network burdens by offloading tape replication tasks to a primary tape device which will more likely than the tape server have greater computational and resource availability to handle the tape replication operations.

Further, described embodiments reduce burdens on both the tape server and tape drive by offloading replication management operations to a separate hardware card in the tape drive, such as a Field Programmable Gate Array (FPGA), to manage discovery, mounting, and replication operations, and consolidate acknowledgments from the different replication tape devices to return a single acknowledgment to the tape server.

Figure 1:
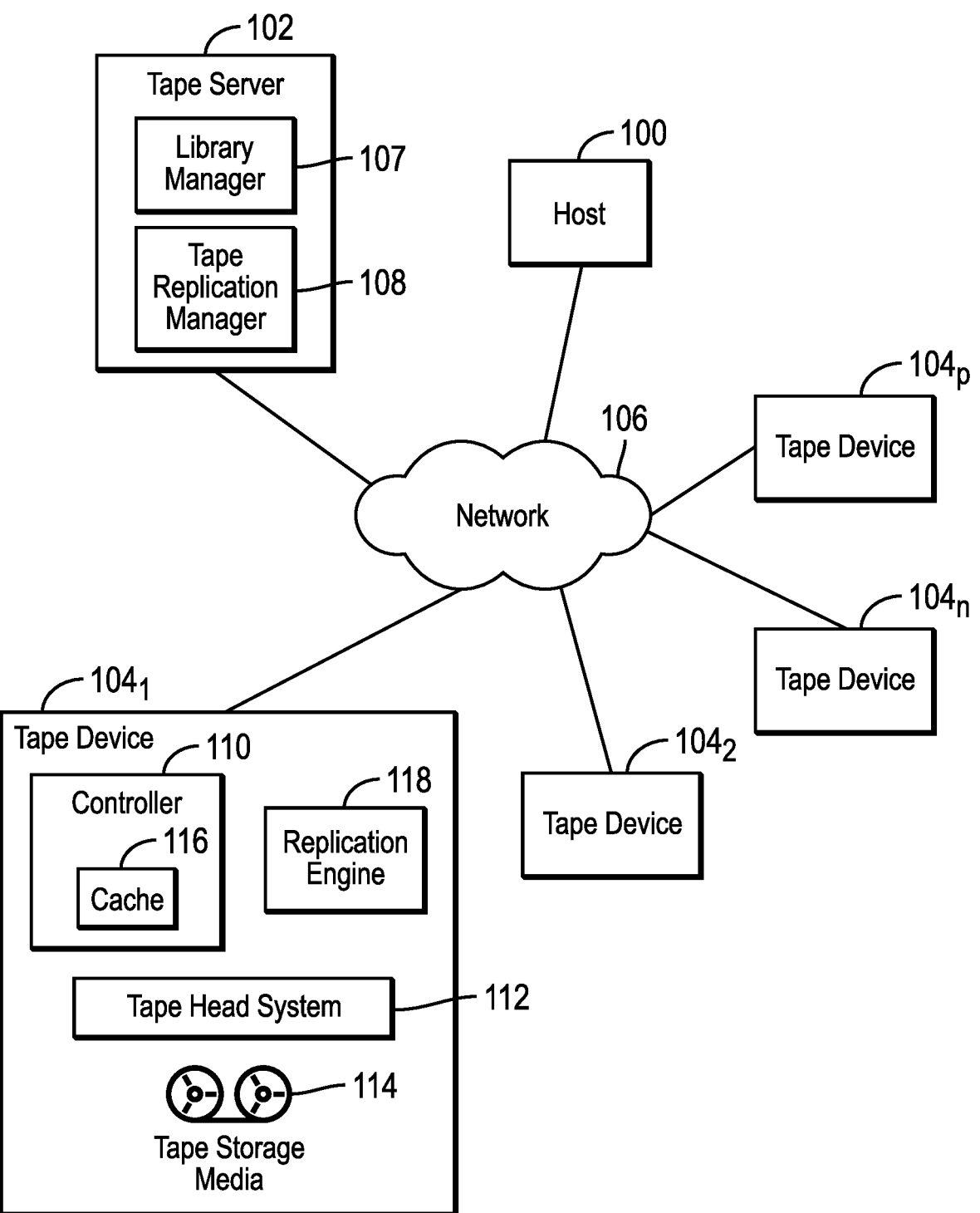
FIG. 1 illustrates an embodiment of a tape replication environment.

FIG. 1 illustrates an embodiment of a data replication environment having host systems 100, a tape server 102 and multiple tape devices 104₁, 104₂ . . . 104ₙ, 104ₚ that communicate over a network 106. The tape server 102 may include a library manager 107 and a replication manager 108. The library manager 107 provides configuration information used to access the tape devices 104₁, 104₂ . . . 104ₙ, 104ₚ which may include a standalone tape drive unit and/or a tape library system including multiple slots in which tape cartridges are stored, multiple tape drives, and a robotic arm to transport tape cartridges among the slots and tape drives. The library manager 107 has information on cartridges at the different tape devices 104₁, 104₂ . . . 104ₙ, 104ₚ slots, and the tape drives in tape library systems. The tape replication manager 108 manages communication with a designated primary tape device 104ₚ to have the primary tape device 104ₚ replicate data from the host 100 system to other of the tape devices 104ᵢ or other remote storage devices other than a tape device, such as a hard disk drive, solid state disk ("SSD"), etc.

The tape devices 104₁, 104₂ . . . 104ₙ, 104ₚ may comprise a tape drive such as shown in tape drive 104₁, and include a controller 110 to receive read and write requests and control a tape head system 112 to read and write data with respect to a mounted tape storage media 114. The controller 110 may buffer data for read and write requests in a cache 116, such that read data in the media 114 is buffered in the cache 116 before being transferred to the tape server 102, and write data from the tape server 102 is buffered before being written to the tape storage media 114. The tape device 104₁ further includes a replication engine 118 to manage replicating data to other remote tape devices 104₂ . . . 104ₙ. The cache 116 may be used to cache write data to replicate for the replication engine 118. If the tape devices 104₁,

3

$104_2$ . . . $104_n$, $104_p$ comprise a tape library, then the tape library would have multiple instances of tape drives as shown in tape device $104_1$.

The replication engine 118 may be comprised of code executed by a processor or implemented in hardware/firmware, such as a separate Field Programmable Gate Array (FPGA), to manage replication of data, provided in a replication request from the host 100, to one or more external tape devices $104_2$ . . . $104_n$, $104_p$. The replication manager 108 opens channels on the network 106 to communicate a replication request to the other tape devices $104_2$ . . . $104_n$, $104_p$ or other storage devices. In further embodiments, the FPGA card implementing the replication engine 118 may include direct connections to one or more of the tape devices $104_1$, $104_2$ . . . $104_n$, $104_p$.

In one embodiment the replication devices $104_1$ . . . $104_n$ to which a primary tape device $104_p$ replicates data may comprise storage devices other than tape devices having, where a tape device has the components of $104_1$, such as virtual tape devices, magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Further, the storage devices $104_1$, $104_2$ . . . $104_n$, $104_p$ may comprise heterogeneous storage devices from different vendors and different types of storage devices, such as a first type of storage devices, e.g., hard disk drives, that have a slower data transfer rate than a second type of storage devices, e.g., SSDs.

The network 106 may comprise configured in a storage network such as one or more interconnected Local Area Networks (LAN), Storage Area Networks (SAN), Wide Area Network (WAN), peer-to-peer network, wireless network, etc.

The program components 107, 108, 110, 118 may comprise program code loaded into a memory and executed by a processor. Alternatively, some or all of the components functions may be implemented in hardware devices, such as in Application Specific Integrated Circuits (ASICs), Field Programmable Gate Array (FPGA) or executed by separate dedicated processors. In one embodiment, the replication engine 118 may be implemented as FPGA card in the tape device $104_i$ to manage channels in the network 106 to communicate with the tape server 102 and other available tape devices $104_2$ . . . $104_n$.

FIGS. 2, 3, 4, and 5 illustrate an embodiment of operations performed by the tape server 102 and a primary tape device $104_p$, comprising one of the tape devices $104_1$, $104_2$ . . . $104_n$, to manage the replication of data to different replication tape devices $104_1$, $104_2$ . . . $104_n$ and/or other types of storage devices With respect to FIG. 2, the tape replication manager 108 receives (at block 200) a host 100 request to replicate data to n+1 tape devices $104_1$ . . . $104_n$, $104_p$, where n is a replication number of tape devices to which the primary tape device $104_p$ is to replicate the data. The tape replication manager 108 selects (at block 202) a primary tape device $104_p$ of the tape devices $104_1$, $104_2$ . . . $104_n$, $104_p$ and sends (at block 204) an inquiry to the selected primary tape device $104_p$ whether it is available. Upon the primary tape device $104_p$ receiving (at block 206) an inquiry if available, the controller 110 sends (at block

4

208) an acknowledgment to the tape server 102 if the primary tape device $104_p$ is available.

Upon the tape replication manager 108 receiving (at block 210) an acknowledgment that the primary tape device $104_p$ is available, the tape replication manager 108 sends (at block 212) a replication inquiry to the primary tape device $104_p$ to inquire whether the primary tape device $104_p$ can transfer writes to n (replication number) of remote tape devices $104_1$ . . . $104_n$ over the network 106. Upon the replication engine 118 in the primary tape device $104_p$ receiving (at block 214) the replication inquiry to inquiry whether it can communicate writes to n remote tape devices $104_1$, $104_2$ . . . $104_n$, the replication engine 118 sends (at block 216) inquiries to the remote tape devices $104_1$, $104_2$ . . . $104_n$ to determine if they are available. If (at block 218) n remote tape devices $104_1$, $104_2$ . . . $104_n$ acknowledge they are available for writes, then the replication engine 118 returns (at block 220) an availability acknowledgement to the replication inquiry to the tape server 102 indicating that n remote tape devices $104_1$, $104_2$ . . . $104_n$ are available for replication. If (at block 218) n remote tape devices $104_1$, $104_2$ . . . $104_n$ did not acknowledge availability for writes, then the replication engine 118 returns (at block 222) to the tape server 102 a fail to the replication inquiry indicating that m remote tape devices $104_1$, $104_2$ . . . $104_m$ are available, where m is less than the replication number n. The tape server proceeds (at block 224) to block 300 in FIG. 3 upon receiving a reply to the replication inquiry, either fail or acknowledge.

Figure 2:
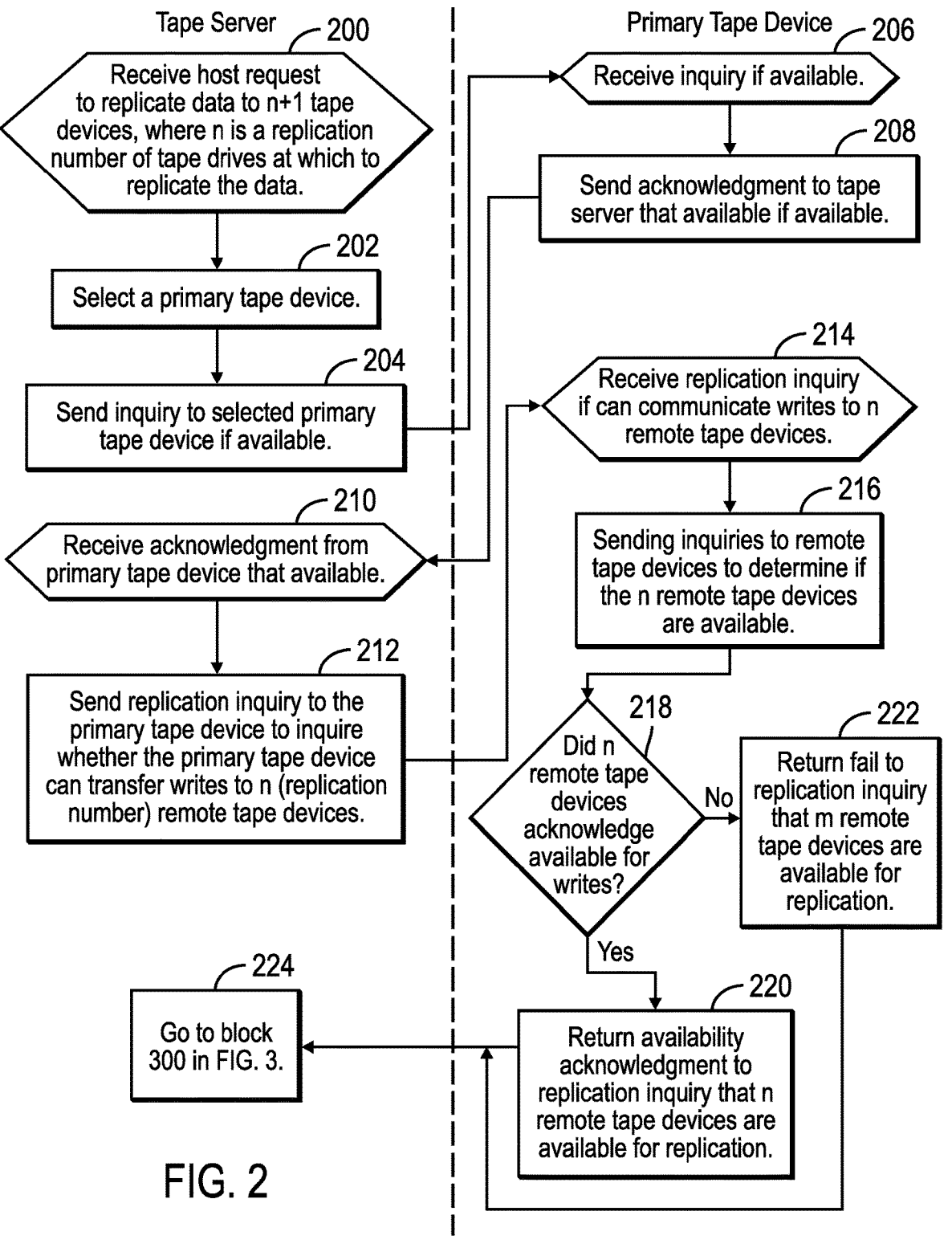
FIG. 2 illustrates an embodiment of operations performed by a tape server and primary tape device to determine available replication devices for a host replication request as part of a replication inquiry.

With the embodiment of FIG. 2, the tape server 102 communicates with a primary tape device $104_p$ to have the primary tape device $104_p$ query other remote tape devices $104_1$, $104_2$ . . . $104_n$ to determine if n remote tape devices are available for replication. In this way, the tape server 102 offloads the operation to locate a primary tape device $104_p$ that is capable of communicating with the requested number of replication devices, e.g., tape devices $104_1$, $104_2$ . . . $104_n$, to satisfy the host 100 replication request. This transfers significant processing burdens from the tape server 102, including computational processing burdens and network load on the tape server 102, to a primary tape device $104_p$, which is likely not engaged in other network communications or computational operations. This improves overall network load and computational efficiency of the components in the replication network 106.

In FIG. 3, the tape server 102 receives (at block 300) a response to the replication inquiry. If (at block 302) the response indicates acknowledge, then control proceeds (at block 304) to block 400 in FIG. 4 to start replication to the selected primary tape device $104_p$. If (at block 302) the response indicates fail and an available number of m tape devices $104_1$, $104_2$ . . . $104_m$ for replication, then if (at block 306) there is another tape device $104_1$, $104_2$ . . . $104_n$ to consider, the tape replication manager 108 proceeds (at block 308) to block 202 in FIG. 2 to select another primary tape device $104_p$ to consider, which may be determined by the library manager 107. If (at block 306) there is not another tape device $104_1$, $104_2$ . . . $104_n$ to consider for the primary tape device $104_p$, then the tape replication manager 108 determines (at block 310) the selected primary tape device that has the maximum m connected tape devices available for replication. If (at block 312) the tape replication manager 108 determines that replication should not proceed with m available tape devices, then fail is returned (at block 314) to the host 100 replication request. If (at block 312) the tape replication manager 108 determines that replication should proceed with m available tape devices, then the tape replication manager 108 proceeds (at block 316) to block 400 in FIG. 4 to invoke mounting on the m+1 tape devices 104$_1$, 104$_2$ . . . 104$_m$, where n=m replication devices. The tape replication manager 108 may indicate a minimum number of replication devices that must be available for a replication request.

With the embodiment of FIG. 3, the tape server 102 may consider different available tape devices 104$_1$, 104$_2$ . . . 104$_n$ to operate as the primary tape device 104$_p$ to attempt to locate one primary tape device 104$_p$ that is capable of communicating with the requested replication number (n) of replication devices. If no tape devices 104$_1$, 104$_2$ . . . 104$_n$ can communicate with the requested replication number of tape or replication devices, then a tape device is determined that can communicate with a maximum number (m) of tape devices 104$_1$, 104$_2$ . . . 104$_n$, less than the requested replication number (n), where m is less than n. The tape server 102 may continue with the host replication request if the m available tape devices satisfy a minimum number of acceptable replication devices to use for the host replication request. The tape replication manager 108 may be programmed with the minimum number of replication devices to allow the tape replication manager 108 to determine whether to continue with replication if all the requested number of replication devices are not available.

Figure 4:
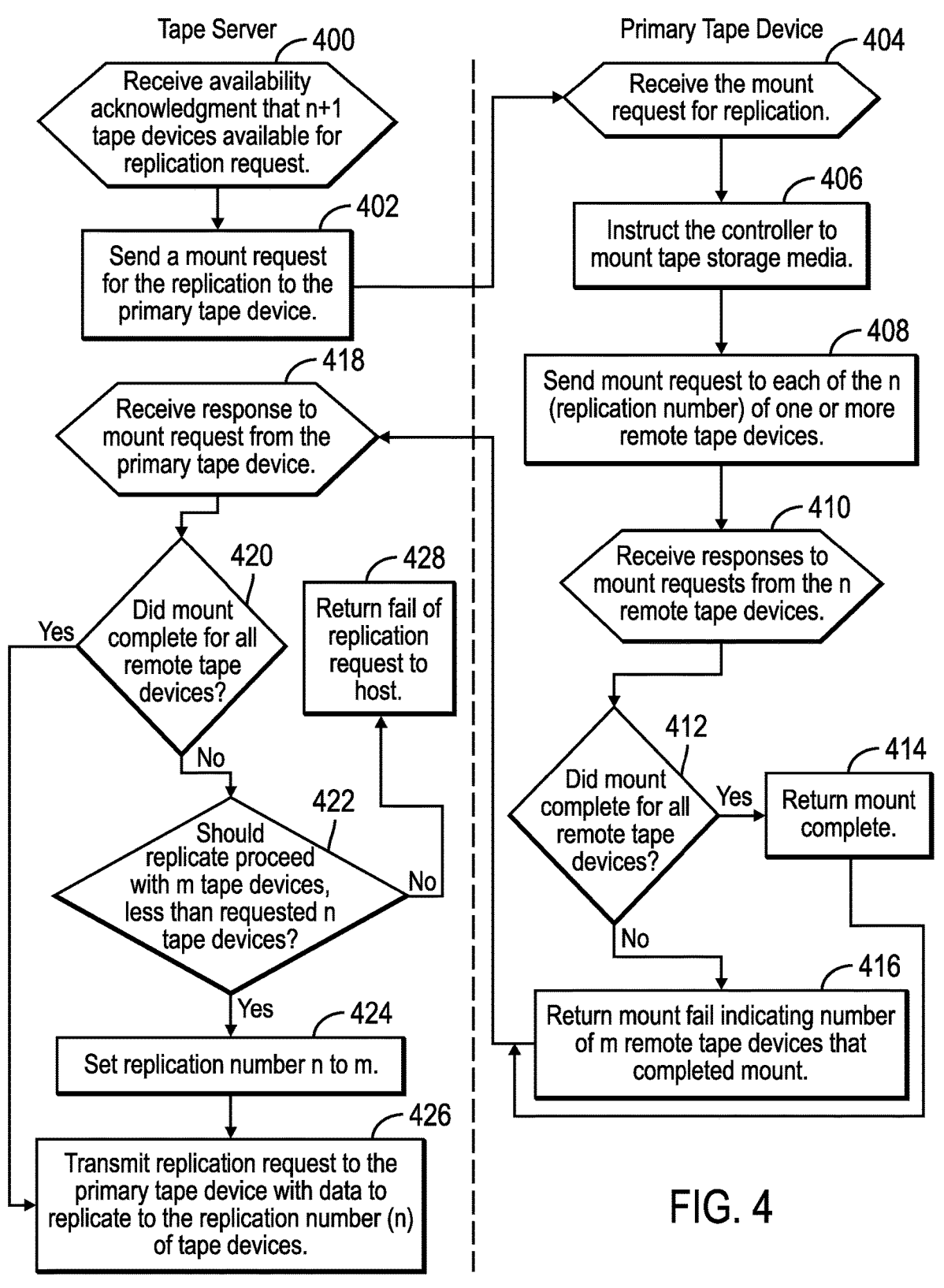
FIG. 4 illustrates an embodiment of operations performed by a tape server and primary tape device to manage mounting of tape media at the primary tape device and replication tape devices to store the data to replicate in the mounted tape media.

In FIG. 4, in response to receiving (at block 400) availability acknowledgment that n+1 tape devices are available for the replication request, the tape replication manager 108 in the tape server 102 sends (at block 402) a mount request for the replication to the primary tape device 104$_p$. In response to the mount request (at block 404), the replication engine 118 at the primary tape device 104$_p$ instructs (at block 406) the tape controller 110 in the primary tape device 104$_p$ to mount the tape media 114 and sends (at block 408) a mount request to each of the n (replication number) of one or more remote tape devices 104$_1$, 104$_2$ . . . 104$_n$. Upon receiving (at block 410) responses to the mount requests sent to the n remote tape devices 104$_1$, 104$_2$ . . . 104$_n$, if (at block 412) the mount completed for all the remote tape devices 104$_1$, 104$_2$ . . . 104$_n$, then complete is returned to the tape server 102 for the mount request. If (at block 412) complete was not returned to the mount request from all the remote tape devices 104$_1$, 104$_2$ . . . 104$_n$, then mount fail is returned (at block 416) to the tape server 102 indicating the number of m remote tape devices 104$_1$, 104$_2$ . . . 104$_m$ that completed the mount, where m is less than n, the requested replication number.

Upon the tape server 102 receiving (at block 418) the response to the mount request from the primary tape device 104$_p$, if (at block 420) the mount did not complete for the requested replication number n of remote tape devices 104$_1$, 104$_2$ . . . 104$_m$, but instead completed for m tape devices 104$_1$, 104$_2$ . . . 104$_m$, where m is less than n, then the tape replication manager 108 determines (at block 422) whether replication should proceed with m tape devices 104$_1$, 104$_2$ . . . 104$_m$, or a replication number of m. If (at block 422) replication should proceed, then n is set (at block 424) to m and the tape replication manager 108 transmits (at block 426) a replication request to the primary tape device 104$_p$ with data to replicate to the replication number (n) of tape devices 104$_1$, 104$_2$ . . . 104$_n$. If (at block 422) the tape replication manager 108 determines (at block 422) that replication should not proceed with m tape devices, which may be indicated in tape replication manager 108 settings, then fail is returned (at block 428) to the host 100 initiating the replication request.

With the embodiment of FIG. 4, the tape server 102 communicates with a primary tape device 104$_p$ to have the primary tape device 104$_p$ manage the mounting of tape media on the replication tape devices 104$_1$, 104$_2$ . . . 104$_n$. In this way, the tape server 102 offloads the mounting operation to the primary tape device 104$_p$. This transfers significant processing burdens from the tape server 102, including computational processing burdens and network load on the tape server 102, to a primary tape device 104$_p$, which is likely not engaged in other network communications or computational operations and has available resources and network bandwidth to manage the mount operations with respect to the replication tape devices 104$_1$, 104$_2$ . . . 104$_n$. This improves overall network load and computational efficiency of the components in the replication network 106.

Figure 5:
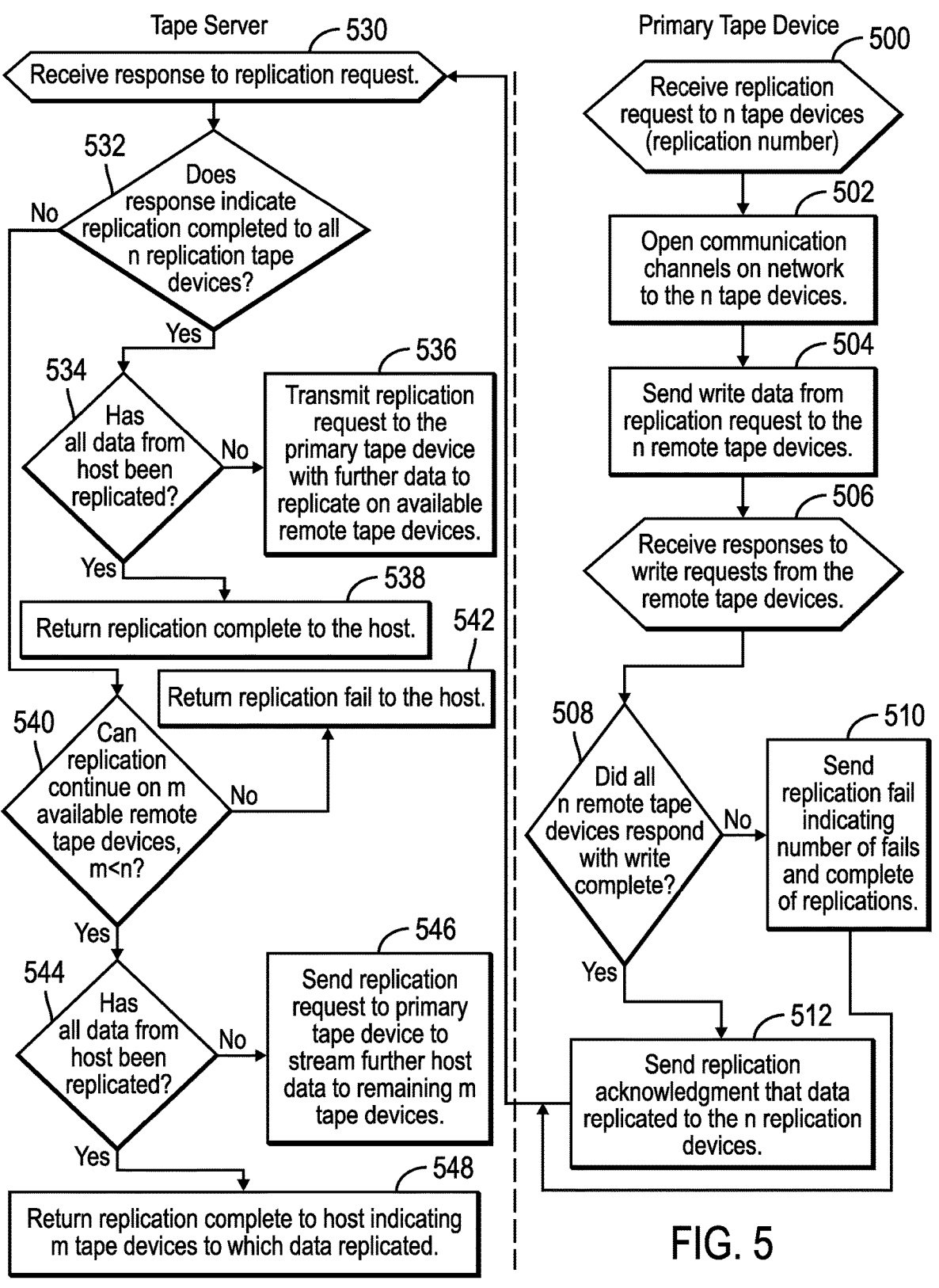
FIG. 5 illustrates an embodiment of operations performed by a tape server and primary tape device to process a replication request to n replication devices to replicate the data from the host replication request.

In FIG. 5, in response to the replication engine 118 in the primary tape device 104$_p$ receiving (at block 500) the replication request, sent at block 426 in FIG. 4, the replication engine 118 opens (at block 502) communication channels on the network 106 to the n tape devices 104$_1$, 104$_2$ . . . 104$_n$ and sends (at block 504) write data from the replication request to the n remote tape devices 104$_1$, 104$_2$ . . . 104$_n$. Upon the replication engine 118 receiving (at block 506) responses to the write requests from the remote tape devices 104$_1$, 104$_2$ . . . 104$_n$, the replication engine 118 determines (at block 508) whether all n remote tape devices 104$_1$, 104$_2$ . . . 104$_n$ responded with complete. If (at block 508) not all the remote tape devices 104$_1$, 104$_2$ . . . 104$_n$ responded with write complete, i.e., some responded with write fail, then the replication engine 118 in the primary tape device 104$_p$ sends (at block 510) a replication fail message to the tape server 102 indicating the number of fails and completes of the writes to the replication tape devices. If (at block 508) write complete was returned from all the replication tape devices 104$_1$, 104$_2$ . . . 104$_n$, then the replication engine 118 sends (at block 512) a replication acknowledgment to the tape server 102 that replication completed to the n replication devices.

Upon the tape replication manager 108 in the tape server 102 receiving (at block 530) a response to the replication request, if (at block 532) the response indicates that replication completed to all n replication tape devices 104$_1$, 104$_2$ . . . 104$_n$, then a determination is made (at block 534) whether all data in the host 100 replication request has been replicated. If (at block 534) not all data from the host 100 has been replicated, then the tape replication manager 108 transmits (at block 536) a further replication request to the primary tape device 104$_p$ with further data to replicate on the available remote tape devices 104$_1$, 104$_2$ . . . 104$_n$. If (at block 534) all data from the host 100 for replication has been replicated, then the tape replication manager 108 transmits (at block 538) replication complete to the host 100.

If (at block 532) the response from the primary tape device 104$_p$ indicates that replication did not complete to all n replication devices, i.e., failed, then the tape replication manager 108 determines (at block 544), such as from predetermined settings, whether replication can continue on the remaining m available remote tape devices 104$_1$, 104$_2$ . . . 104$_m$, where m is less than n. If (at block 544) m is not a sufficient number of replication devices, then replication fail is returned (at block 542) to the host 100. If (at block 540) the m available replication devices are sufficient to continue replication, then the tape replication manager 108 determines (at block 544) whether all data from the host 100 has been replication. If (at block 544) not all host 100 data has been replicated, then the tape replication manager 108 sends (at block 546) a further replication request to the primary tape device 104$_p$ to stream further host 100 data on the remaining m tape devices. If (at block 544) all host 100 data has been replicated, then replication complete is returned (at block 548) to the host indicating the m number of tape devices 104$_1$, 104$_2$ . . . 104$_m$ to which data is replicated.

With the embodiment of FIG. 5, the tape server 102 communicates with a primary tape device 104$_p$ to have the primary tape device 104$_p$ manage the replication operations with the replication tape devices 104$_1$, 104$_2$ . . . 104$_n$. In this way, the tape server 102 offloads the replication operations to the primary tape device 104$_p$ that is capable of communicating the write request to the requested number of replication devices, e.g., tape devices 104$_1$, 104$_2$ . . . 104$_n$, to satisfy the host 100 replication request. This transfers significant processing burdens from the tape server 102, including computational processing burdens and network load on the tape server 102, to a primary tape device 104$_p$, which is likely not engaged in other network communications or computational operations. This improves overall network load and computational efficiency of the components in the replication network 106 by offloading the replication operations to a tape device.

The tape server 102 and the tape devices 104$_1$, 104$_2$ . . . 104$_n$ may communicate commands, messages, inquiries, etc. using the Small Computer System Interface (SCSI) tape command structure, to initiate tape writes, inquire on availability of the tape devices 104$_1$, 104$_2$ . . . 104$_n$, initiate commands to mount and load tape media, etc. Other tape command interfaces may also be used.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow-chart and/or block diagram block or blocks.

The flowchart and block diagrams in the Figures illustrate the architecture, functionality, and operation of possible implementations of systems, methods, and computer pro-gram products according to various embodiments of the present invention. In this regard, each block in the flowchart or block diagrams may represent a module, segment, or portion of instructions, which comprises one or more executable instructions for implementing the specified logi-cal function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block dia-grams and/or flowchart illustration, can be implemented by special purpose hardware-based systems that perform the specified functions or acts or carry out combinations of special purpose hardware and computer instructions.

The computational components of FIG. 1, including the host 100, tape server 102, and tape devices $104_1$, $104_2$ . . . $104_n$, $104_p$ may include components of a computer system, such as the computer system 602 shown in FIG. 6. Computer system/server 602 may be described in the general context of computer system executable instructions, such as pro-gram modules, being executed by a computer system. Gen-erally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

Figure 6:
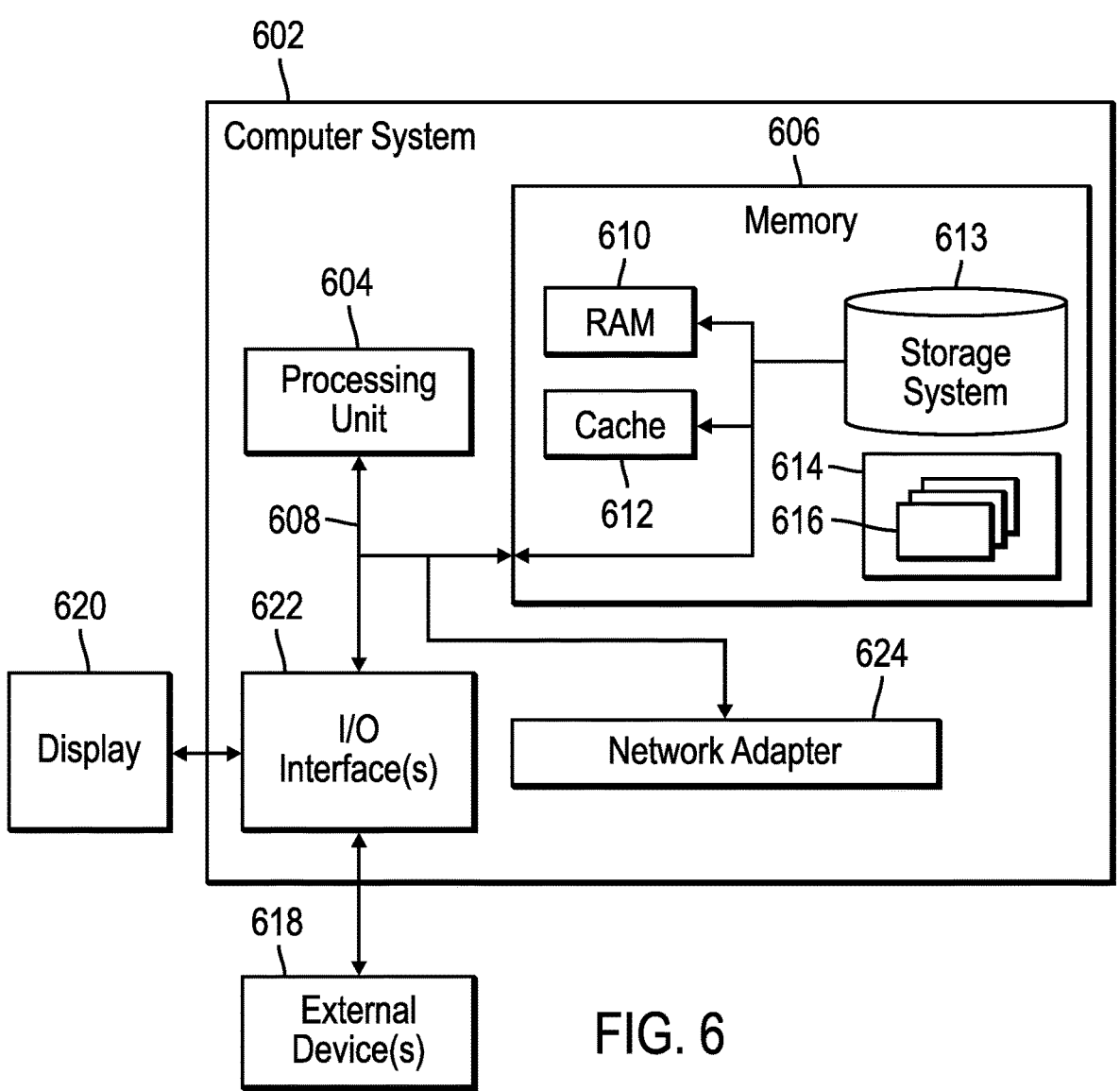
FIG. 6 illustrates a computing environment in which the components of FIG. 1 may be implemented.

As shown in FIG. 6, the computer system/server 602 is shown in the form of a general-purpose computing device. The components of computer system/server 602 may include, but are not limited to, one or more processors or processing units 604, a system memory 606, and a bus 608 that couples various system components including system memory 606 to processor 604. Bus 608 represents one or more of any of several types of bus structures, including a memory bus or memory controller, a peripheral bus, an accelerated graphics port, and a processor or local bus using any of a variety of bus architectures. By way of example, and not limitation, such architectures include Industry Stan-dard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media.

System memory 606 can include computer system read-able media in the form of volatile memory, such as random access memory (RAM) 610 and/or cache memory 612. Computer system/server 602 may further include other removable/non-removable, volatile/non-volatile computer system storage media. By way of example only, storage system 613 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 608 by one or more data media interfaces. As will be further depicted and described below, memory 606 may include at least one program product having a set (e.g., at least one) of program modules that are configured to carry out the functions of embodiments of the invention.

Program/utility 614, having a set (at least one) of program modules 616, may be stored in memory 606 by way of example, and not limitation, as well as an operating system, one or more application programs, other program modules, and program data. Each of the operating system, one or more application programs, other program modules, and program data or some combination thereof, may include an imple-mentation of a networking environment. The components of the computer 602 may be implemented as program modules 616 which generally carry out the functions and/or method-ologies of embodiments of the invention as described herein. The systems of FIG. 1 may be implemented in one or more computer systems 602, where if they are implemented in multiple computer systems 602, then the computer systems may communicate over a network.

Computer system/server 602 may also communicate with one or more external devices 618 such as a keyboard, a pointing device, a display 620, etc.; one or more devices that enable a user to interact with computer system/server 602; and/or any devices (e.g., network card, modem, etc.) that enable computer system/server 602 to communicate with one or more other computing devices. Such communication can occur via Input/Output (I/O) interfaces 622. Still yet, computer system/server 602 can communicate with one or more networks such as a local area network (LAN), a general wide area network (WAN), and/or a public network (e.g., the Internet) via network adapter 624. As depicted, network adapter 624 communicates with the other compo-nents of computer system/server 602 via bus 608. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

The terms "an embodiment", "embodiment", "embodi-ments", "the embodiment", "the embodiments", "one or more embodiments", "some embodiments", and "one embodiment" mean "one or more (but not all) embodiments of the present invention(s)" unless expressly specified oth-erwise.

The terms "including", "comprising", "having" and varia-tions thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A tape device for writing data to a tape storage media and in communication with a remote storage device and a computing device over a network, comprising:
   a tape device housing separate from the remote storage device and the computing device, comprising:
   a tape head to read and write to the tape storage media;
   a controller to control the tape head to write data from the computing device to the tape storage media;
   a replication engine to perform:
      receiving, from the computing device, a replication request to replicate data to the remote storage device over the network;
      transmitting the data to replicate to the remote storage device;
      sending a write request to the controller to write the data to replicate to the tape storage media;
      receiving a device acknowledgment from the remote storage device indicating complete of writing the data to replicate; and
      transmitting a replication acknowledgment to the computing device indicating that the data in the replication request has been replicated in response to receiving the device acknowledgment from the remote storage device.

2. The tape device of claim 1, wherein the remote storage device comprises a remote tape device to write data to tape storage media in the remote tape device.

3. The tape device of claim 1, wherein the operations further comprise:
   receiving an inquiry from the computing device to inquire whether the tape device can communicate with a replication number of remote storage devices to which to replicate data; and

determining whether the replication number of the remote storage devices are available; and
   sending an availability acknowledgment to the computing device that the replication number of the remote storage devices are available in response to determining that the replication number of the remote storage devices are available, wherein the availability acknowledgment causes the computing device to send the replication request.

4. The tape device of claim 1, wherein the replication request to replicate data to the remote storage device comprises a request to replicate data to a plurality of remote tape devices, wherein the operations further comprise:
   receiving a mount request from the computing device;
   sending mount requests to the plurality of remote tape devices in response to the mount request from the computing device;
   receiving mount completes from the plurality of remote tape devices indicating that tape storage media was mounted at the plurality of remote tape devices; and
   sending a mount acknowledgment to the computing device indicating that the plurality of remote tape devices successfully mounted tape storage media, wherein the replication request is received from the computing device in response to the computing device receiving the mount acknowledgment.

5. The tape device of claim 1, wherein the replication request is to replicate data to a plurality of remote storage devices, wherein the operations further comprise:
   receiving write completes from the plurality of remote storage devices that writing the data to replicate completed, wherein the replication acknowledgment is sent to the computing device in response to receiving the write completes from the plurality of remote storage devices, wherein the replication acknowledgment is sent in response to receiving the write completes from the plurality of remote storage devices.

6. The tape device of claim 1, wherein the replication request is to replicate data to a plurality of remote storage devices, wherein the operations further comprise:
   receiving fail from at least one of the plurality of remote storage devices that write of the data to replicate failed;
   receiving write complete from at least one of the plurality of remote storage devices that the write of the data to replicate succeeded;
   sending a message to the computing device indicating that replication of the data failed in response to receiving the fail; and
   receiving a continue request from the computing device to continue replication of the data to the at least one of the plurality of remote storage devices that sent the received write complete.

7. The tape device of claim 6, wherein the replication acknowledgment is sent in response to receiving complete of the write of the data from the at least one of the plurality of remote storage devices that sent the received write complete.

8. The tape device of claim 1, wherein the tape device and the remote storage device each are a member of a set of tape devices consisting of a stand alone tape device and a tape library having a plurality of tape devices in which to store data.

9. A computer program product for replicating data, wherein the computer program product comprises a computer readable storage medium having program instructions executable by a processor to cause operations, the operations comprising:

receiving, from a computing device, a replication request to replicate data to a remote storage device over a network, wherein the computer readable storage medium is included in a tape device comprising a tape device housing separate from the remote storage device and the computing device, wherein the tape device housing includes a tape head to read and write to a tape storage media, a controller, and the computer readable storage medium;

transmitting the data to replicate to the remote storage device;

sending a write request to the controller in the tape device to write the data from the computing device to replicate to the tape storage media, wherein the controller controls the tape head to write the data to the tape storage media;

receiving a device acknowledgment from the remote storage device indicating complete of writing the data to replicate; and transmitting a replication acknowledgment to the computing device indicating that the data in the replication request has been replicated in response to receiving the device acknowledgment from the remote storage device.

10. The computer program product of claim 9, wherein the operations further comprise:

receiving an inquiry from the computing device to inquire whether the tape device can communicate with a replication number of remote storage devices to which to replicate data; and determining whether the replication number of the remote storage devices are available; and sending an availability acknowledgment to the computing device that the replication number of the remote storage devices are available in response to determining that the replication number of the remote storage devices are available, wherein the availability acknowledgment causes the computing device to send the replication request.

11. The computer program product of claim 9, wherein the replication request to replicate data to the remote storage device comprises a request to replicate data to a plurality of remote tape devices, wherein the operations further comprise:

receiving a mount request from the computing device;

sending mount requests to the plurality of remote tape devices in response to the mount request from the computing device;

receiving mount completes from the plurality of remote tape devices indicating that tape storage media was mounted at the plurality of remote tape devices; and sending a mount acknowledgment to the computing device indicating that the plurality of remote tape devices successfully mounted tape storage media, wherein the replication request is received from the computing device in response to the computing device receiving the mount acknowledgment.

12. The computer program product of claim 9, wherein the replication request is to replicate data to a plurality of remote storage devices, wherein the operations further comprise:

receiving write completes from the plurality of remote storage devices that writing the data to replicate completed, wherein the replication acknowledgment is sent to the computing device in response to receiving the write completes from the plurality of remote storage devices, wherein the replication acknowledgment is sent in response to receiving the write completes from the plurality of remote storage devices.

13. The computer program product of claim 9, wherein the replication request is to replicate data to a plurality of remote storage devices, wherein the operations further comprise:

receiving fail from at least one of the plurality of remote storage devices that write of the data to replicate failed;

receiving write complete from at least one of the plurality of remote storage devices that the write of the data to replicate succeeded;

sending a message to the computing device indicating that replication of the data failed in response to receiving the fail; and receiving a continue request from the computing device to continue replication of the data to the at least one of the plurality of remote storage devices that sent the received write complete.

14. A method for replicating data implemented in a tape device writing data to a tape storage media, comprising:

receiving from a computing device, a replication request to replicate data to a remote storage device, wherein the tape device comprises a tape device housing separate from the remote storage device and the computing device, wherein the tape device housing includes a tape head to read and write to the tape storage media and a controller;

transmitting the data to replicate to the remote storage device;

sending a write request to the controller to write the data to replicate to the tape storage media, wherein the controller controls the tape head to write the data to the tape storage media;

receiving a device acknowledgment from the remote storage device indicating complete of writing the data to replicate; and transmitting a replication acknowledgment to the computing device indicating that the data in the replication request has been replicated in response to the receiving the device acknowledgment from the remote storage device.

15. The method of claim 14, comprising:

receiving an inquiry from the computing device to inquire whether the tape device can communicate with a replication number of remote storage devices to which to replicate data; and determining whether the replication number of the remote storage devices are available; and sending an availability acknowledgment to the computing device that the replication number of the remote storage devices are available in response to determining that the replication number of the remote storage devices are available, wherein the availability acknowledgment causes the computing device to send the replication request.

16. The method of claim 14, wherein the replication request to replicate data to the remote storage device comprises a request to replicate data to a plurality of remote tape devices, further comprising:

receiving a mount request from the computing device;

sending mount requests to the plurality of remote tape devices in response to the mount request from the computing device;

receiving mount completes from the plurality of remote tape devices indicating that tape storage media was mounted at the plurality of remote tape devices; and sending a mount acknowledgment to the computing device indicating that the plurality of remote tape devices successfully mounted tape storage media, wherein the replication request is received from the computing device in response to the computing device receiving the mount acknowledgment.

17. The method of claim 14, wherein the replication request is to replicate data to a plurality of remote storage devices, further comprising:

receiving fail from at least one of the plurality of remote storage devices that write of the data to replicate failed;

receiving write complete from at least one of the plurality of remote storage devices that the write of the data to replicate succeeded;

sending a message to the computing device indicating that replication of the data failed in response to receiving the fail; and receiving a continue request from the computing device to continue replication of the data to the at least one of the plurality of remote storage devices that sent the received write complete.

\* \* \* \* \*